United States Patent [19]

Eguchi

[11] Patent Number: 5,341,399
[45] Date of Patent: Aug. 23, 1994

[54] DIGITAL TRANSMISSION TEST SIGNAL GENERATING CIRCUIT

[75] Inventor: Takeo Eguchi, Kanagawa, Japan
[73] Assignee: Sony Corporation, Tokyo, Japan
[21] Appl. No.: 865,974
[22] Filed: Apr. 9, 1992

[30] Foreign Application Priority Data

Apr. 11, 1991 [JP] Japan .................. 3-079013

[51] Int. Cl.$^5$ .................. H04B 3/46; H04B 17/00
[52] U.S. Cl. .................. 375/10; 324/76.11; 455/67.4
[58] Field of Search .............. 375/10, 13, 98; 370/13; 371/45.1, 20.1; 324/76 R; 358/139; 455/115, 67.1, 67.4, 226.1

[56] References Cited

U.S. PATENT DOCUMENTS

| | | | |
|---|---|---|---|
| 3,803,361 | 4/1974 | Nugent | 375/56 |
| 3,894,298 | 7/1975 | Schollmeier | 375/10 |
| 3,924,188 | 12/1975 | Hofbauer | 375/10 |
| 4,199,668 | 4/1980 | Scozzari | 375/10 X |
| 4,377,822 | 3/1983 | Noirel et al. | 375/10 X |

FOREIGN PATENT DOCUMENTS

0138613A2 4/1985 European Pat. Off. ...... H04N 17/00
3601605A1 7/1987 Fed. Rep. of Germany ........ H04N 17/00

Primary Examiner—Tesfaldet Bocure
Attorney, Agent, or Firm—Limbach & Limbach; Philip M. Shaw, Jr.

[57] ABSTRACT

Disclosed is a digital transmission test signal generating circuit for generating a digital test signal applied to a digital signal transmission system having a scrambler, a transmission path, a gain control circuit, a phase locked loop, a descrambler, and a display supplied with the output of the descrambler. The digital transmission test signal generating circuit comprises a digital signal generator. The digital signal generator generates repeatedly specific data with a predetermined bit pattern. The timing of the digital test signals is controlled by digital signal generator in such a manner that the data will occur in the duration corresponding to a predetermined area of the display. The specific data generated constitute the worst-case state for the target transmission system to operate in. This provides easy, visual checks on the system to see on a monitor if it functions normally given the worst-case signals to work with. No specialized measuring instruments are required for the checks.

7 Claims, 3 Drawing Sheets

FIG. 5A
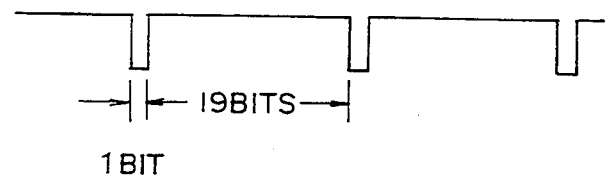
FIG. 5B
FIG. 6A
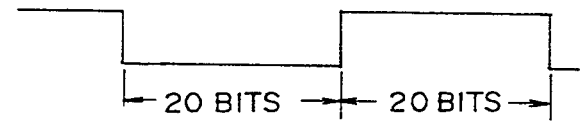
FIG. 6B

DIGITAL TRANSMISSION TEST SIGNAL GENERATING CIRCUIT

BACKGROUND OF THE INVENTION

1. Field of the Invention

The present invention relates to a digital transmission test signal generating circuit suitable for checking digital signal transmission systems.

2. Description of the Prior Art

The SMPTE (Society of Motion Picture and Television Engineers, Inc.) of the United States is expected to adopt a scrambled NRZI (no-return-to-zero inverted code) method as its standard method for interfacing digital video/audio data primarily on an intra-office basis. This method involves having a transmitting side scramble 10-bit input data by performing a modulo-2 division thereon using a polynomial:

$$G(x) = (x+1)(x^9 + x^4 + 1)$$

and having a receiving side descramble the data by performing a module-2 multiplication thereon using the same polynomial.

One disadvantage of this method is that its automatic gain control (AGC) circuit for automatic compensation of cable-induced deterioration can malfunction due to the presence of DC components generated upon input of a specific combination of video/audio data.

For example, suppose that 10-bit hexadecimal data "300" and "198" are supplied alternately, as shown in FIG. 5 (A). In this case, DC components are generated in the scrambled data. This is the worst state for the AGC circuit to operate in, as depicted in FIG. 5 (B).

Another disadvantage of the above method is that a specific combination of input data may suppress for an extended period of time the signal transition (i.e., from "1" to "0" or from "0" to "1") that would normally occur at substantially constant intervals.

For example, suppose that 10-bit hexadecimal data "110" and "200" are supplied alternately, as shown in FIG. 6 (A). In that case, signal transition only occurs every 20 clock pulses in the scrambled data. This is the worst state for the phase-locked loop (PLL) circuit to operate in for clock reproduction, as illustrated in FIG. 6 (B).

Statistically, the worst-case states described above almost never occur during ordinary signal transmissions. But there is no absolute guarantee that they will be completely eliminated.

In addition to the above cases discussed by the SMPTE, there also exist worst-state signals for the digital signal transmission system to operate with if the scrambling method remains the same regardless of the contents of the signals transmitted.

Since the incidence of such worst-case signals is not appreciably high, it has been conventionally difficult to check digital signal transmission systems (i.e., newly manufactured or readjusted equipment) for their performance with worst-case signals while such systems are allowed to operate under ordinary operating conditions.

SUMMARY OF THE INVENTION

It is therefore an object of the present invention to provide a digital transmission test signal generating circuit that generates test signals by which to check digital signal transmission systems easily for performance.

In carrying out the invention and according to one aspect thereof, there is provided a digital transmission test signal generating circuit for generating a digital test signal applied to a digital signal transmission system having encoding means, a transmission path, decoding means and a display supplied with the output of the decoding means; the digital transmission test signal generating circuit comprising: generating means for generating repeatedly specific data with a predetermined bit pattern; and timing means for controlling the generating means in such a manner that the data will occur in the duration corresponding to a predetermined area of the display.

Specific data are first prepared in a way that should affect a target transmission system in the worst manner in its specific operation. If the transmission system functions normally, the data having passed therethrough cause an image with particular brightness and color to be displayed in particular areas of the screen. If the transmission system fails to function normally, the data acquire an error during passage therethrough and produce changes in the image displayed in those particular areas of the screen. This makes it possible to check the target transmission system for performance with the worst-case data in an easy, visual manner without recourse to special measuring instruments.

Further objects, features and advantages of the invention will become more apparent upon a reading of the following description and appended drawings.

BRIEF DESCRIPTION OF THE DRAWINGS

FIGS. 5A and 5B is a set of views depicting typical worst-case data for AGC operation during data transmission under the scrambled NRZI method; and FIGS. 6A and 6B is a set of views showing typical worst-case data for clock signal reproduction under the scrambled NRZI method.

DESCRIPTION OF THE PREFERRED EMBODIMENT

A preferred embodiment of the invention will now be described with reference to FIG. 1. The embodiment constitutes a circuit arrangement for checking a transmission system that transmits digital video data under the scrambled NRZI method.

Figure 1:
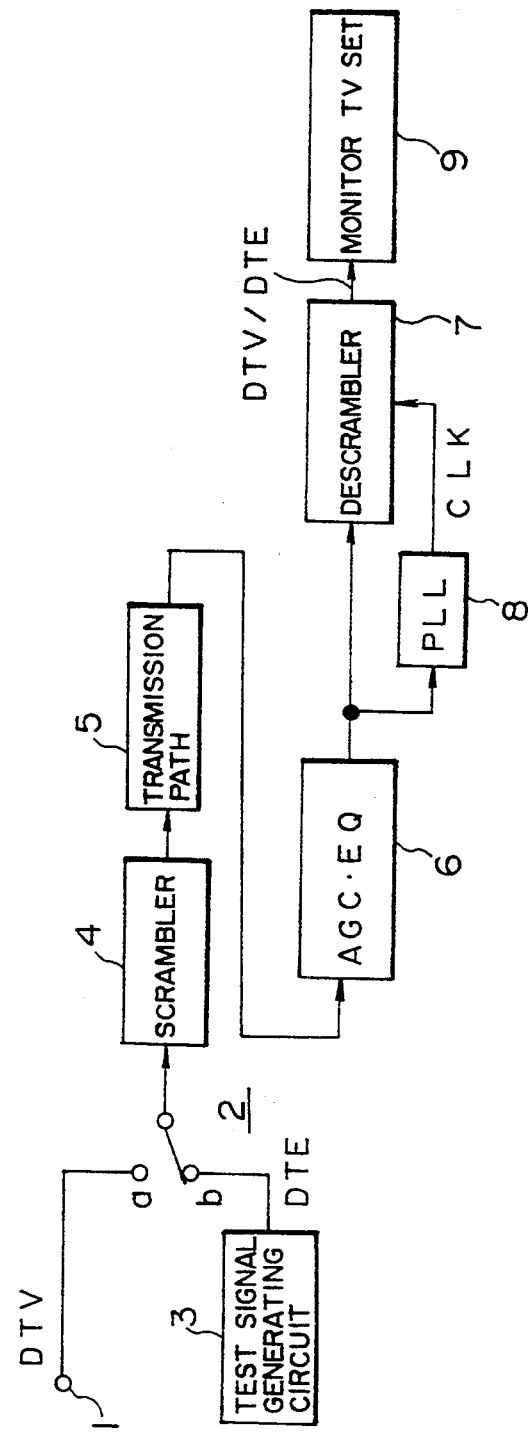
FIG. 1 is a block diagram of a digital transmission test signal generating circuit embodying the invention.

In FIG. 1, digital video data DTV fed to a terminal 1 are forwarded to the "a" side fixed terminal of a changeover switch 2. The "b" side fixed terminal of the changeover switch 2 is supplied with a test signal DTE from a test signal generating circuit 3.

The test signal DTE comprises two combinations of alternately repeated 10-bit hexadecimal data. One data combination is made of "300" and "198" continuing alternately for display on the upper part of the screen, and the other combination is constituted by "110" and "200" continuing alternately for display on the lower part of the screen.

The output data from the changeover switch 2 are fed to a scrambler 4. The scrambler 4 scrambles the data by performing a modulo-2 division thereon using the polynomial:

$$G(x)=(x+1)(x^9+x^4+1)$$

After being scrambled by the scrambler 4, the data are forwarded over a transmission path 5 to a circuit 6 comprising an AGC part and a equalizer part. The AGC part controls gain in such a way that keeps the level of the transmitted data constant. The equalizer part corrects the high and low frequency characteristics that were deteriorated during transmission, whereby the inter-symbol interference involved is suppressed.

The output data from the circuit 6 are supplied to both a descrambler 7 and a PLL circuit 8. The PLL circuit 8 reproduces the clock signal that is sent to the descrambler 7.

The descrambler 7 descrambles the received data by performing a module-2 multiplication thereon using the above polynomial. The descrambling takes place in synchronism with the clock signal CLK. After being descrambled by the descrambler 7, the data are supplied to a monitor TV set 9.

In operation, the changeover switch 2 is first placed in the "a" position. This causes the scrambler 4 to scramble the digital video data DTV. The scrambled data are sent over the transmission path 5 and through the circuit 6 to the descrambler 7. In turn, the descrambler 7 outputs the descrambled digital video data DTV to the monitor TV set 9. The screen of the monitor TV set 9 displays the image produced by the received digital video data DTV.

When the changeover switch 2 is placed in the "b" position, the scrambler 4 scrambles the test signal DTE. As described, the test signal DTE corresponding to the upper part of the screen is the combination of hexadecimal 10-bit data "300" and "198" continuing alternately. Thus the scrambled data develop a DC component (see FIG. 5 (B)), which constitutes the worst state for the AGC part of the circuit 6 to operate in. This is because the DC component can cause the AGC part to deviate from its normal judging operation. On the other hand, the test signal DTE corresponding to the lower part of the screen is the above-mentioned combination of hexadecimal 10-bit data "110" and "200" continuing alternately. Thus the scrambled data cause one signal transition to occur only every 20 clock pulses (see FIG. 6 (B)). This is the worst state for the PLL circuit 8 to reproduce clock pulses in.

Figure 2:
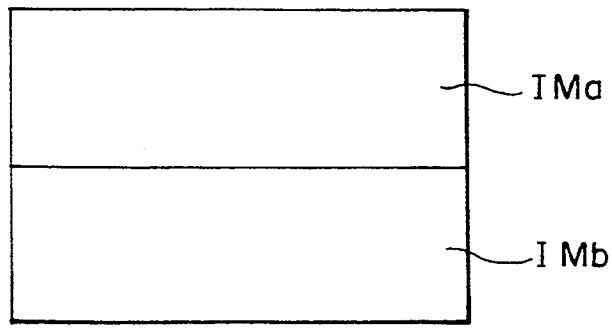
FIG. 2 is a view showing what a monitor screen illustratively displays when an AGC part and a PLL circuit of a target system function normally.

The output data from the scrambler 4 are sent over the transmission path 5 and through the circuit 6 to the descrambler 7. If the AGC part of the circuit 6 functions normally, the data output by the descrambler with respect to the upper area of the screen are hexadecimal 10-bit data "300" and "198" alternated continuously. This causes an image IMa with predetermined brightness and color to be displayed in the upper area of the screen on the monitor TV set 9 (see FIG. 2). If the PLL circuit 8 functions normally, the data output by the descrambler 7 with respect to the lower area of the screen are hexadecimal 10-bit data "110" and "200" alternated continuously. This causes the lower area of the screen of the monitor TV set 9 to display an image IMb with levels of brightness and color different from those of the image IMa (see FIG. 2).

If, on the other hand, the AGC part of the circuit 6 fails to function normally, the data output by the descrambler 7 with respect to the upper area of the screen develop an error that keeps the hexadecimal 10-bit data "300" and "198" from continuing alternately. This causes an image IMa' having drop-out noise NS to be displayed in the upper area of the screen of the monitor TV set 9 (see FIG. 3). If the PLL circuit 8 fails to function normally, the resulting bit slip generates an error in the data output by the descrambler 7 with respect to the lower area of the screen. That error prevents the hexadecimal 10-bit data "110" and "200" from continuing alternately. As a result, the lower area of the screen of the monitor TV set 9 displays an image IMb' having drop-out noise NS (see FIG. 4).

Figure 3:
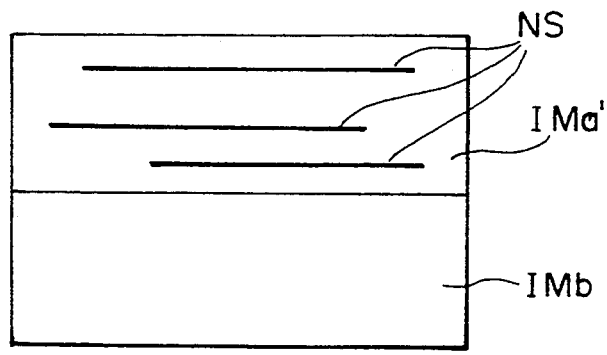
FIG. 3 is a view depicting what the monitor screen illustratively displays when the AGC part and the PLL circuit of the target system fail to function normally.
Figure 4:
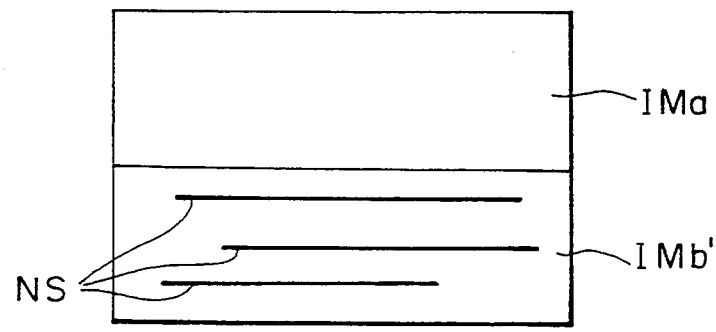
FIG. 4 is a view indicating what the monitor screen illustratively displays when the PLL circuit fails to function normally.

As described, the test signal DTE generated by the test signal generating circuit 3 with respect to the upper area of the screen constitutes the hexadecimal 10-bit data "300" and "198" alternated continuously. When scrambled, these data make up the worst-state signal for the AGC part of the circuit 6 to operate with. The test signal DTE generated by the test signal generating circuit 3 with respect to the lower area of the screen constitutes the hexadecimal 10-bit data "110" and "200" alternated continuously. After being scrambled, these data form the worst-state signal with which the PLL circuit 8 reproduces clock pulses. When the AGC part of the circuit 6 fails to function normally in the worst state entered by placing the changeover switch 2 in the "b" position, the image IMa' having drop-out noise NS is displayed in the upper area of the screen of the monitor TV set 9 (FIG. 3). When the PLL circuit 8 fails to function normally in the worst state prepared therefor, the image IMb' having drop-out noise NS appears in the lower area of the screen of the monitor TV set 9 (FIG. 4).

Thus the above embodiment permits easy, visual checks on the AGC part of the circuit 6 and on the PLL circuit 8 to see if they function normally in their respective worst states. No specialized measuring instruments are needed for the checks.

With these circuits found to operate normally, the scrambled NRZI method for extensive spectrum generation may be used for binary data transmission. This makes it possible to manufacture necessary hardware with relative ease and at reduced costs.

Although the above embodiment is constructed to check transmission systems that transmit data under the scrambled NRZI method, other embodiments of the invention may be devised to generate similar signals with which to check other transmission systems that transmit data under other methods. In such cases, the test signal is the worst-state signal for each circuit of a given transmission system to operate with. The worst-case signal is generated repeatedly with respect to specific areas of the screen.

The above embodiment has divided the screen into two areas in which the AGC part of the circuit 6 and the PLL circuit 8 are checked for their operation. Alternatively, the screen may be used as a single area or may be divided into three or more areas for checks on as many test items. As many test signals DTE as the number of the areas allocated on the screen may be generated to check the multiple items concurrently and efficiently.

As described and according to the invention, specific data are generated to constitute the worst-case state for the target transmission system to operate in. This provides easy, visual checks on the system to see on a monitor if it functions normally given the worst-case signals to work with. No specialized measuring instruments are required for the checks. Where a number of data repeat operations are involved, as in PCM transmissions, the economic benefits made available with the invention applied to the whole measuring setup in question are considerable.

While a preferred embodiment of the invention has been described using specific terms, such description is for illustrative purposes only, and it is to be understood that changes and variations may be made without departing from the spirit or scope of the following claims.

What is claimed is:

1. A digital transmission test signal generating circuit for generating a digital test signal and applying the digital test signal to a digital signal transmission system, the digital signal transmission system including a series connection of an encoding means, a transmission path, decoding means, and a display supplied with an output of the decoding means, the digital transmission test signal generating circuit comprising:

generating means for generating and applying to the encoding means as the digital test signal a first predetermined repeated bit pattern to cause a first predetermined image to appear at a first predetermined area on the display if a first predetermined component within the digital signal transmission system operates normally in processing the first predetermined repeated bit pattern and another, different second predetermined image to appear on the display if the first predetermined component operates abnormally in processing the first predetermined repeated bit pattern.

2. A digital transmission test signal generating circuit according to claim 1, wherein the decoding means includes gain control means for controlling a gain level of digital signals passing through the transmission path, and wherein the first predetermined repeated bit pattern comprises a worst-case bit pattern selected to be the most likely of a predetermined group of bit patterns to cause the gain control means to fail to function normally.

3. A digital transmission test signal generating circuit according to claim 1, wherein the decoding means includes a phase locked loop circuit for reproducing a clock signal, and wherein the first predetermined repeated bit pattern comprises a worst-case bit pattern selected to be the most likely of a predetermined group of bit patterns to cause the phase locked loop circuit to fail to function normally.

4. A digital transmission test signal generating circuit according to claim 1, wherein the decoding means includes gain control means and a phase locked loop circuit, the gain control means controlling a gain level of digital signals supplied to the decoding means, the phase locked loop circuit being responsive to the gain controlled digital signals supplied to the decoding means for reproducing a clock signal, wherein the generating means generates and applies to the encoding means, as a part of the digital test signal, a second predetermined repeated bit pattern, and wherein the first predetermined repeated bit pattern comprises a first predetermined worst-case bit pattern selected to be the most likely of a group of predetermined bit patterns to cause the gain control means to fail to function normally and to cause the second predetermined image to appear at the first predetermined area of the display, the second predetermined repeated bit pattern comprises a second predetermined worst-case bit pattern selected to be most likely of a group of predetermined bit patterns to cause the phase locked loop circuit to fail to function normally in processing the second predetermined worst-case bit pattern and cause a third predetermined image to appear at a second predetermined area of the display.

5. A digital transmission test signal generating circuit according to claim 4, wherein the second predetermined area is the lower half of the display.

6. A digital transmission test signal generating circuit according to claim 1, wherein the encoding means includes a data scrambling circuit and the decoding means includes a data descrambling circuit.

7. A digital transmission test signal generating circuit according to claim 1, wherein the first predetermined area is the upper half of the display.

* * * * *